(12) United States Patent
Vassilatos

(10) Patent No.: US 6,432,340 B1
(45) Date of Patent: Aug. 13, 2002

(54) HIGH SPEED MELT-SPINNING OF FIBERS

(75) Inventor: George Vassilatos, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/511,042

(22) Filed: Feb. 23, 2000

Related U.S. Application Data

(60) Provisional application No. 60/121,978, filed on Feb. 26, 1999.

(51) Int. Cl.[7] ............................. D01F 6/60; D01F 6/62
(52) U.S. Cl. .................................... 264/176.1
(58) Field of Search ...................... 264/176.1

(56) References Cited

U.S. PATENT DOCUMENTS

| | | | |
|---|---|---|---|
| 4,442,057 A | * | 4/1984 | Brody .................... 264/211.22 |
| 4,518,744 A | | 5/1985 | Brody |
| 5,525,700 A | * | 6/1996 | Samuels et al. ............ 528/190 |

FOREIGN PATENT DOCUMENTS

| | | |
|---|---|---|
| EP | 0 080 273 A2 | 6/1983 |
| EP | 0030417 B2 | 12/1983 |
| GB | 1487843 A | 10/1977 |
| JP | 57-101020 A | 6/1982 |

OTHER PUBLICATIONS

H. Mark, Et. Al., Ed., Fibers, Manufacture, Encyclopedia of Polymer Science and Engineering, 1986, 802–839, vol. 6, John Wiley & Sons, New York.

W. Gerhartz, Et Al., Ed., General Production Technology, Ullmann's Encyclopedia of Industrial Chemistry, 5th Ed., 1987, 511–566, vol. A10, VCH Verlagsgesellschaft mbH, Weinheim.

* cited by examiner

*Primary Examiner*—Leo B. Tentoni

(57) ABSTRACT

Thermoplastics may be melt spun at high production rates, and without physical property degradation, by spinning a blend of the thermoplastic and a minor amount of a specified liquid crystalline polymer.

7 Claims, 1 Drawing Sheet

HIGH SPEED MELT-SPINNING OF FIBERS

CROSS REFERENCE TO RELATED APPLICATION

This application claims priority of Provisional Application No. 60/121,978 filed Feb. 26, 1999.

FIELD OF THE INVENTION

Thermoplastics may be melt spun at exceptionally high speeds, while maintaining desirable properties that are obtained at lower spinning speeds, by adding a small amount of a liquid crystalline polymer containing repeat units derived from specified monomers.

BACKGROUND OF THE INVENTION

Fibers made from thermoplastics, both natural and synthetic, are important items of commerce. These fibers are used for apparel, luggage, thread, and industrial uses. Oftentimes these fibers are formed by melt spinning, that is by melting the thermoplastic, forcing (extruding) the molten polymer through a small orifice (spinneret), cooling, and then using that extrudate, perhaps after having undergone other treatments such as drawing, as a fiber, see for example H. Mark, et al., Ed., Encyclopedia of Polymer Science and Engineering, Vol. 6, John Wiley & Sons, New York, 1986, p. 802–839, and W. Gerhartz, et al., Ed., Ullmann's Encyclopedia of Industrial Chemistry, $5^{th}$ Ed., Vol. A10, VCH Verlagsgesellschaft mbH, Weinheim, 1987, p. 511–566. Many important types of fibers are spun in this way, for example polyesters, polyamides (nylons), and polyolefins.

Melt spinning technology is relatively mature, and in recent years improvements have centered around producing higher quality more consistent fibers, and in improving the productivity of spinning equipment to lower spinning costs. One way to accomplish the latter is to increase spinning speeds, i.e., increase the length of fiber produced per unit time at constant dpf through a spinneret hole. This has been accomplished partly by improving the spinning machines themselves, for example by modifying the windup part of the machines to increase the speed at which the fiber can be wound onto a bobbin. Very high windup speeds (WUS), for example 6,000 m/minute, can be obtained on some spinning machines.

However, it has been found that often when fiber is spun at very high speeds, the properties of the fiber are different from those of fibers spun at lower speeds. In many cases the properties of the fiber spun at high speed are poorer for certain uses than those spun at lower speeds, and so the spinning speed may be limited not by equipment limitations, but on the properties needed in the fiber obtained. Therefore methods of obtaining higher WUS (which is the actual speed of production of the fiber) without substantially deleteriously affecting the fiber properties are desired.

The effects of changing spinning speeds are varied. For instance in U.S. Pat. No. 4,442,057 at column 1, lines 7–33, to it is stated "Some preliminary molecular orientation is induced in the fibers during melt spinning and this is increased by drawing to the degree required for any given fiber product. Drawing may be operated as a completely separate process after winding up and storing spun filaments or it may immediately follow spinning by forwarding spun filaments directly at controlled speed to a drawing process without interruption, or it may be still more closely integrated with spinning by omitting even intermediate speed control between spinning and drawing as for example in British Pat. No. 1,487,843.

Increasing the spinning speed increases the production rate but also increases the preliminary orientation thereby reducing the extensibility of the filaments and the extent to which they can be drawn. This has various disadvantages in different contexts. In certain speed ranges it can result in unacceptable product variability at otherwise practicable speeds: in processes aimed at very high tenacity filaments it can reduce the tenacity achievable: and in spin-lag-draw processes the reduction in subsequent draw ratio reduces the decitex required at spinning, partially offsetting the production rate advantage of the higher spinning speed. Various means have been proposed to mitigate these disadvantages in the manufacture of fibers of polyethylene terephthalate by suppressing the preliminary orientation induced at spinning."

Higher WUS also can lead to shorter elongations to break, higher tensile modulus at lower elongations (say 50 or 100%), any or all of which are disadvantageous in some applications.

U.S. Pat. No. 4,442,057 describes the addition of small amounts of liquid crystalline polymers (LCP) to thermoplastics to allow high speed fiber spinning while maintaining desirable polymer properties. LCPs of the composition described herein are not mentioned.

U.S. Pat. No. 4,518,744 describes the use of various polymers as additives in thermoplastics to allow high speed fiber spinning while maintaining desirable polymer properties. LCPs are not mentioned in this patent.

European Patent Application 80,273 describes the use of thermoplastic blends with other polymers, including LCPs, to make bulked fibers using melt spinning. The LCPs described herein are not mentioned.

U.S. Pat. No. 5,525,700 describes certain liquid crystalline polymer compositions, some of which are used herein. However fiber spinning is not mentioned in this patent.

SUMMARY OF THE INVENTION

This invention concerns a process for the melt spinning of one or more thermoplastics at windup speeds of about 1000 m/minute or more, wherein the improvement comprises, spinning said thermoplastic or thermoplastics as a blend which contains about 0.1 to about 10 percent by weight of a liquid crystalline polymer, said percentage based on a total amount of said thermoplastic or thermoplastics plus said liquid crystalline present, and provided that said liquid crystalline polymer consists essentially of repeat units of the formula:
(I) at least one repeat unit selected from the group consisting of

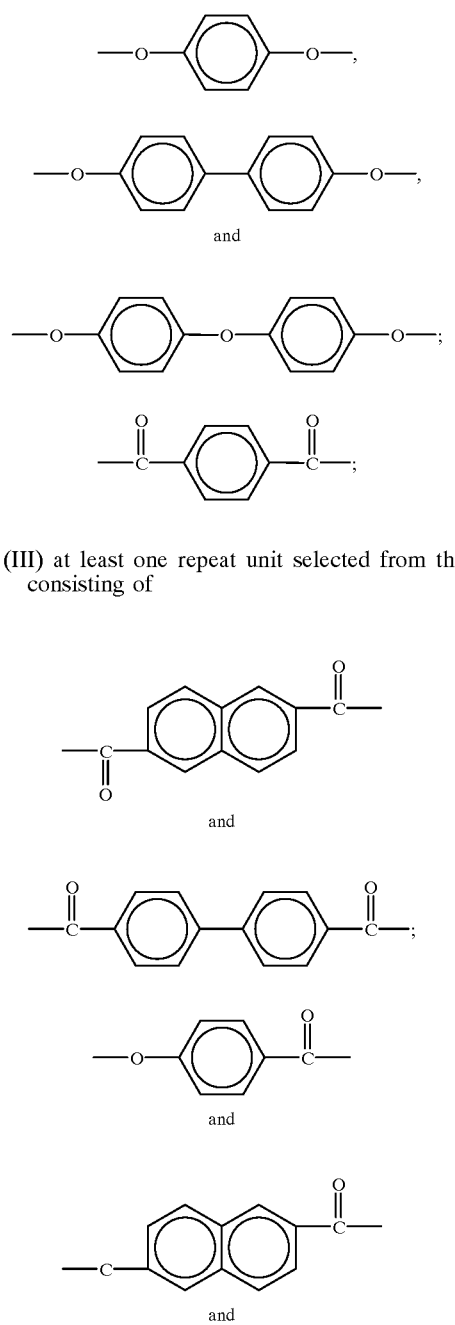

(III) at least one repeat unit selected from the group consisting of wherein:
a molar ratio of (II) to (III) ranges from about 25:75 to about 90:10;
a molar ratio of (I) to [(II)+(III)] is substantially 1:1;
a molar ratio of (IV) to (V) ranges from about 97:3 to about 50:50;
a number of moles of (IV) plus (V) ranges from about 100 to about 600 per 100 moles of (I); and
wherein (I), (II), (III), (IV), (V) and (VI) are in units of moles.

Throughout this Application the number of moles of (I) is the total moles of (IA) plus (IB) plus (IC) and the total number of moles of (III) is the total moles of (IIIA) plus (IIIB).

This invention also concerns a composition, comprising:
(a) from about 99.9 to about 90 percent by weight of a thermoplastic;
(b) from about 0.1 to about 10 percent by weight of a liquid crystalline polymer consisting essentially of repeat units of the formula:
 (I) at least one repeat unit selected from the group consisting of

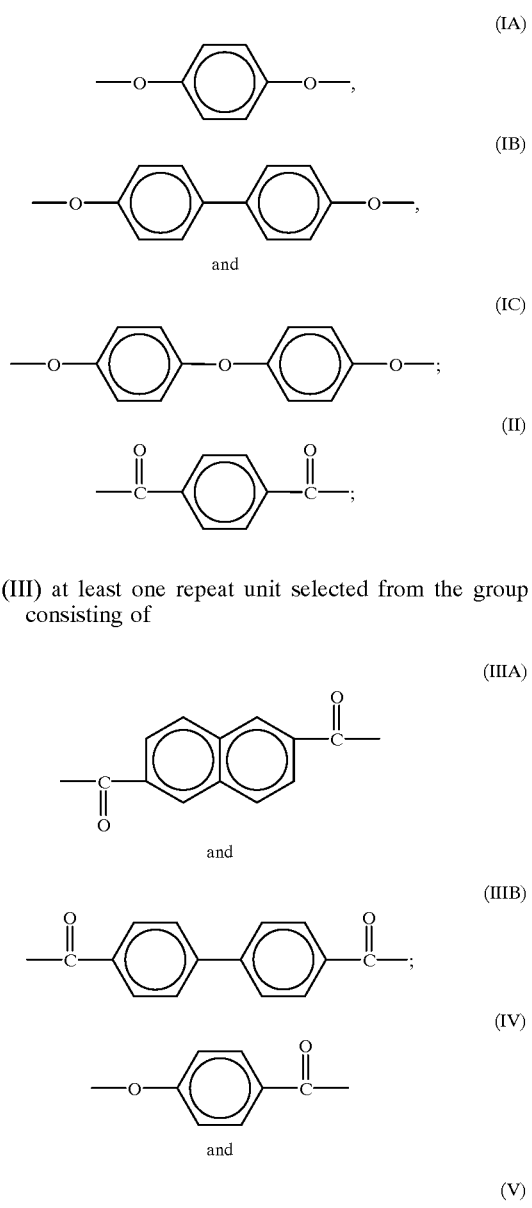

(III) at least one repeat unit selected from the group consisting of wherein:
a molar ratio of (II) to (III) ranges from about 25:75 to about 90:10;
a molar ratio of (I) to [(II)+(III)] is substantially 1:1;
a molar ratio of (IV) to (V) ranges from about 97:3 to about 50:50;

a number of moles of (IV) plus (V) ranges from about 100 to about 600 per 100 moles of (I); and wherein (I), (II), (III), (IV), (V) and (VI) are in units of moles, and said percent by weight of (a) and said percent by weight of (b) are based on the total amount of (a) and (b) present.

PREFERRED EMBODIMENTS OF THE INVENTION

Figure 1:
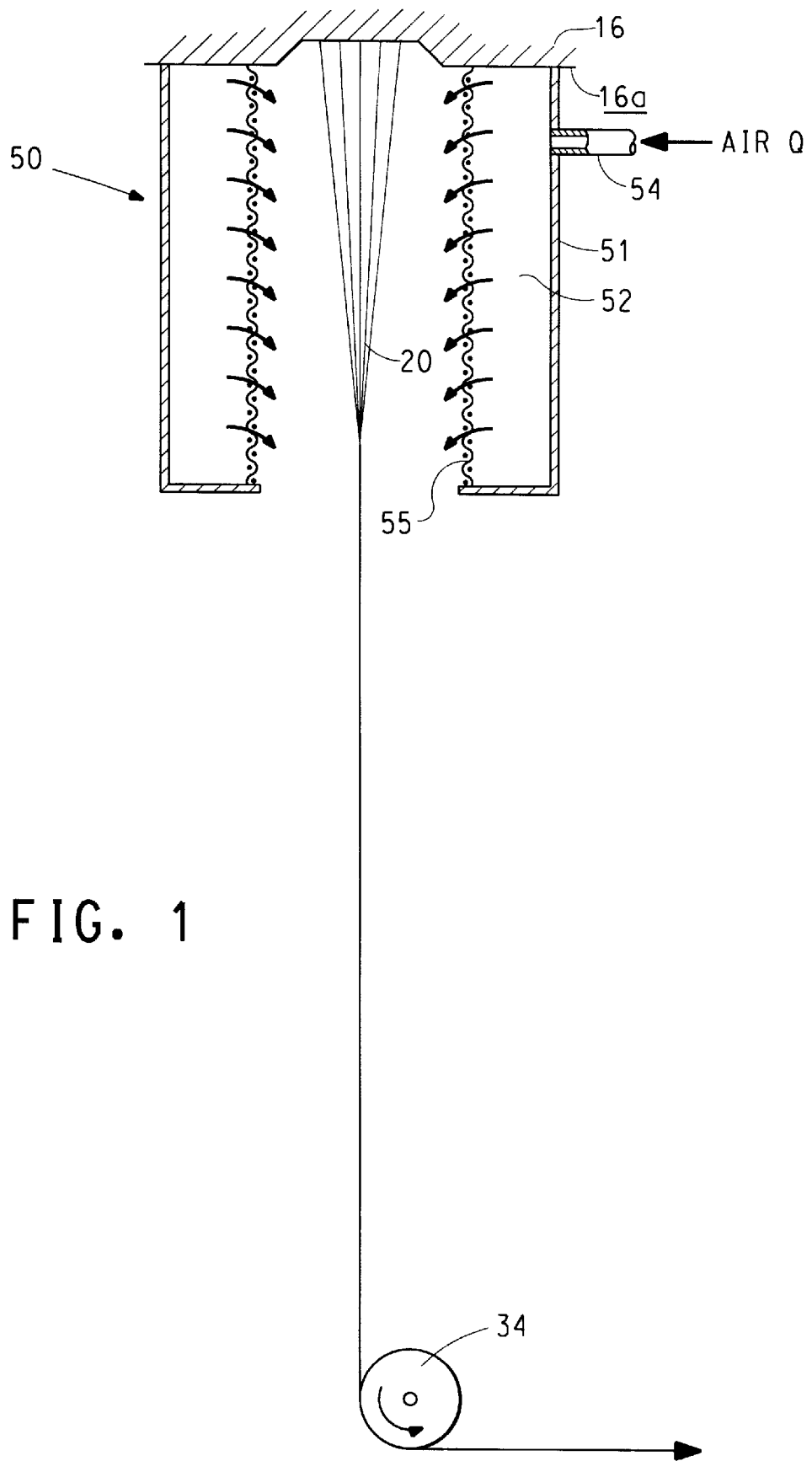
FIG. 1 shows a quench apparatus used in spinning the fiber of Examples 17–22 and Comparative Examples N–P herein.

The LCPs used herein are described in U.S. Pat. No. 5,525,700, which is hereby included by reference, and methods of making such polymers are described therein. The molar ratio of repeat units (IA) to (IB) to (IC) ranges from 0:0:100 to 0:100:0 to 100:0:0. Preferably, repeat units (IA) and (IB) are present, with the molar ratio of (IA) to (IB) ranging from about 1:99 to about 99:1. In a preferred LCP, repeat units (IA) and (IB) are present, with the molar ratio of (IA) to (IB) ranging from about 75:25 to about 25:75, and/or the molar ratio of (II):(III) ranges from about 30:70 to about 85:15, and/or the molar ratio of (IV):(V) is from about 50:50 to about 90:10, and/or the number of moles of (IV) plus (V), per 100 moles of (I), ranges from about 200 to about 500.

It is understood by the artisan that in order to readily form high molecular weight LCP, the molar ratio of the diols [i.e., (IA), (IB) and/or (IC)] to the diacids [i.e., (II) and (IIIA) and/or (IIIB)] present in the polymerization of monomers to form an LCP should be about 1:1. Small deviations from this ratio are not critical, but large deviations are normally to be avoided, since it usually prevents or slows polymerization to relatively high molecular weight.

The process of the invention is suited to the melt spinning of fiber-forming thermoplastic polymers such as polyesters, polyamides, copolyesters, copolyamides or polyolefins, for example poly(ethylene terephthalate) and its copolyesters, polycaprolactam, poly(hexamethylene adipamide), polypropylene, polyethylene, acrylic polymers, vinyl chloride and vinylidene-chloride-based polymers, polystyrene, polyphenylene oxide/polystyrene blends, polysulphones and polyethersulfones, polyketones and polyetherketones, polyfluoroolefins, polyoxymethylenes, thermoplastic cellulosic polymers, and other biologically produced polymers, such as poly(hydroxybutyrate). Preferred thermoplastics are polyesters such as poly(1,3-propylene terephthalate), poly (ethylene terephthalate) (PET), and poly(1,4-butylene terephthalate), and polyamides such as polyhexamethylene adipamide (nylon-6,6) and polycaprolactam (nylon-6).

Preferably the mixture of the LCP and the thermoplastic contains about 99.5 to about 95 percent by weight of the thermoplastic and about 0.5 to about 5.0 percent by weight of the LCP. The polymer mixture and the resulting fiber may also contain the usual amounts of other materials found in thermoplastic fibers, such as pigments, dyes, antioxidants, lubricants, antistatics, antimicrobials, and flame retardants. The mixture of the LCP and thermoplastic may be made by a number of standard methods, for example they may be melt mixed in a single or twin screw extruder, formed into pellets, and then be remelted for melt spinning. Or a mixture of LCP and thermoplastic particles may be made by pellet blending and then melt mixed just before being melt spun, in other words the melt mixing may take place in the melting step for melt spinning. It is preferred that the blend of the LCP and thermoplastic be relatively uniform, so that consistent quality fiber may be produced, and thus preferred that melt mixing take place under the relatively high shear conditions found in melt polymer apparatus such as single and twin screw extruders. As described in U.S. Pat. No. 4,518,744 it is preferred if the LCP has a particle size in the melt of about 0.5 to 3 $\mu$m prior to the actual spinning of the fiber.

The melt spinning is carried out under conditions that are normal for melt spinning the thermoplastic being used, except that higher fiber production speeds may be used. By fiber production speed is meant the final length of fiber produced per unit time, synonymous herein with WUS. The normal spinning temperature of a thermoplastic will usually be above its glass transition temperature and melting point (if it has a melting point), but below a temperature at which sufficient thermal degradation takes place to affect fiber properties significantly. At whatever the spin temperature used is, the LCP should be melt processible, that is molten, at that temperature. An advantage of the present LCPs is that by varying their composition within the limits described above, LCPs with a wide range of melting points can be made. Thus both the thermoplastic and LCP used should be melt processible at the spinning temperature.

The WUS is about 1000 m/min or more, preferably about 2000 m/min or more, and especially preferably about 3000 m/min or more.

Using the LCPs described herein higher production speeds are possible than with other LCPs while maintaining good fiber properties and/or being able to use lesser amounts of LCP to obtain similar production rates. Since LCPs are generally more expensive than most thermoplastics used for fibers, this is an advantage. At lower LCP amounts there is also less risk the LCP will adversely affect other fiber properties, such as dyeability. The Examples herein demonstrate the unexpected advantages of the current LCPs over other LCPs in high speed spinning of thermoplastics.

It is known that when the spinning speed of poly(ethylene terephthalate) (PET) or nylon-66 fibers increases either at constant melt throughput per spinneret hole or at constant decitex per filament the % elongation-to-break of the fibers or the draw force required to draw the yarn under some specified conditions increases due to the higher molecular orientation of the yarn. Yet, it is desirable to be able to spin at higher speeds without altering the % elongation-to-break or the draw tension of the yarn because this higher spinning productivity reduces the cost of fiber manufacture. The following Examples illustrate this type of information.

In the Examples the following abbreviations are used:
E—elongation at break
CLOTH, CO—LCPs used in U.S. Pat. No. 4,442,057
PI—productivity increase
WUS—windup speed
An Instron® Tester was used for testing tensile properties of the fibers, and the gauge length used was 10.16 cm and the strain rate was 25% per minute.

The draw tension, in grams, was measured at a draw ratio of 1.7x, and at a heater temperature of 180° C. Draw tension was used as a measure of orientation. Draw tension was measured on an apparatus equivalent to a DTI 400 Draw Tension Instrument, available from Lenzing Technik. Normally an increase in the withdrawal or windup speed is accompanied by an increase in the draw tension and a reduction in the elongation, which can be undesirable, whereas we have achieved increases in the withdrawal speed at constant decitex per filament without increasing the draw tension.

the productivity increase in each are shown in Table 1. The data labeled "Brody" are taken from Table 1 of U.S. Pat. No. 4,442,057, and show that the present LCP is superior to the LCP used in Table 1 of this issued patent. The productivity increase was computed using the formula shown at column 4, line 55 of U.S. Pat. No. 4,442,057.

The throughput was 0.666 grams per minute per hole in all cases. The dpf was 6.0 (6.67 decitex per filament) at 1000 m/min and it decreased as the speed increased.

TABLE 1

| Ex. | WUS m/min | % LCP | Spinning Temp., ° C. | % E | (1+% E/100) (Average) | % PI | Comparative % PI, Brody[a] CLOTH |
|---|---|---|---|---|---|---|---|
| A | 1000 | 0 | 282.6 | 280 | 3.8 | — | — |
| 1 | 1000 | 3 | 280.8 | 417 | 5.2 | 36.8 | 12 |
| 2a | 1000 | 6 | 287.1 | 401 | | | |
| 2b | | | 290.3 | 413 | | | |
| 2c | | | 293.7 | 394 | 5.0 | 31.6 | 12 |
| B | 2000 | 0 | 282.0 | 165 | 2.6 | — | — |
| 3a | 2000 | 3 | 280.7 | 318 | | | |
| 3b | | | 286.9 | 307 | 4.1 | 57.7 | 17 |
| 4a | 2000 | 6 | 290.3 | 318 | | | |
| 4b | | | 294.1 | 320 | 4.2 | 61.5 | 33 |
| C | 4000 | 0 | 292.0 | 81 | 1.8 | — | — |
| 5a | 4000 | 3 | 286.9 | 199 | | | |
| 5b | | | 292.2 | 133 | | | |
| 5c | | | 300.0 | 136 | 3.0 | 66.7 | 30 |
| 6 | 4000 | 6 | 293.8 | 235 | 3.4 | 88.8 | 59 |
| D | 1000 | 0 | 287.0 | 285 | 3.9 | — | — |
| 7 | 1000 | 1 | 287.0 | 364 | 4.6 | 17.8 | — |
| E | 2000 | 0 | 287.0 | 153 | 2.5 | — | — |
| 8 | 2000 | 1 | 287.0 | 224 | 3.2 | 28.0 | — |
| F | 4000 | 0 | 287.0 | 66 | 1.7 | — | — |
| 9 | 4000 | 1 | 287.0 | 96 | 2.0 | 17.6 | — |

[a]From Table 1 of U.S. Pat. No. 4,442,057

In all of the Examples the LCP polymer used had the same composition as the polymer made in Example 6 of U.S. Pat. No. 5,525,700.

EXAMPLES 1–9 and

Comparative Example A–F

Pellets of the LCP (where used) and a commercial grade poly(ethylene terephthalate) were compounded in a Baker-Perkins twin-screw extruder. The diameter of the screw flight was 4.921 cm (1.9375 in) and the screws operated at 100 rpm. The feed zone of the extruded was at 230° C., and the barrel temperatures were 230° C., 270° C. and 290° C. At the end of the extruder a spinning block was attached which housed a melt filter-pack and a spinneret plate with 34 holes. The melt spinning temperatures are reported in Table 1. The diameter of each hole was 0.38 mm (0.015 in) and the melt throughput was 40 g per hour per hole. The freshly spun filaments were cooled in ambient air without any forced air flow or any special quenching apparatus. The cooled filaments, after finish application, were wound up at 1000, 2000 and 4000 m/min. The throughput per hole remained constant and, consequently, finer filaments were produced as the windup speed increased. The intrinsic viscosity of the control PET after spinning was 0.65. These results as well as

EXAMPLES 10–16 and

Comparative Examples G–M

Pellets of a commercial grade poly(ethylene terephthalate) were compounded in a Baker-Perkins twin-screw extruder. The diameter of the screw flight was 4.921 cm (1.9375 in) and the screws operated at 100 rpm. The feed zone of the extruded was at 230° C., and the barrel temperatures were 230° C., 270° C. and 290° C. At the end of the extruder a spinning block was attached which housed a melt filter-pack and a spinneret plate with 34 holes. The melt spinning temperatures are reported in Table 2. The diameter of each hole was 0.23 mm (0.009 in) and the melt throughput was 98 g per hour per hole. The freshly spun filaments were cooled in ambient air without any forced air flow or any special quenching apparatus. The cooled filaments, after finish application, were wound up at the speeds shown in Table 2. The throughput per hole remained constant and, consequently, finer filaments were produced as the windup speed increased. The intrinsic viscosity of the control PET after spinning was 0.65. The results as well as the productivity increase in every case are shown in Table 2. The data labeled "Brody" are taken from Table 3 of U.S. Pat. No. 4,442,057, and in show that the present LCP is superior to the LCP used in Table 3 of this issued patent. The productivity increase was computed using the formula shown at column 4, line 55 of U.S. Pat. No. 4,442,057.

The throughput was 1.63 grams per minute per hole in all cases. The dpf was 7.35 at 2000 m/min and it decreased as the spinning speed increased.

by withdrawal roll 34. Finish is applied above roll 34. Yarn was wound up at 4118, 4575, 5032 and 5490 m/min. Table 3 summarizes the draw tension for the control nylon-66 fibers as well as for the blend of nylon-66 with 0.5 weight % of LCP HX-8000-270.

TABLE 2

| Ex. | WUS m/min | % LCP | Spinning Temp., ° C. | % E | (1+% E/100) (Average) | % PI | Comparative % PI, Brody[a] CLOTH | CO |
|---|---|---|---|---|---|---|---|---|
| G | 2000 | 0 | 293.0 | 219 | 3.2 | — | — | — |
| H | 2500 | | | 168 | 2.7 | — | — | — |
| I | 3000 | | | 135 | 2.4 | — | — | — |
| J | 3500 | | | 113 | 2.1 | — | — | — |
| K | 4000 | | | 97 | 2.0 | — | — | — |
| L | 4500 | | | 79 | 1.8 | — | — | — |
| M | 5000 | | | 66 | 1.7 | — | — | — |
| 10 | 2000 | 3 | 292.0 | 324 | 4.2 | 32.9 | 22 | 0 |
| 11 | 2500 | | | 271 | 3.7 | 38.9 | — | 0 |
| 12 | 3000 | | | 253 | 3.5 | 50.2 | 23 | 4 |
| 13 | 3500 | | | 214 | 3.1 | 47.4 | — | — |
| 14 | 4000 | | | 196 | 3.0 | 50.2 | 22 | 19 |
| 15 | 4500 | | | 165 | 2.7 | 48.6 | 24 | 37 |
| 16 | 5000 | | | 133 | 2.3 | 39.5 | 30 | — |

[a]From Table 3 of U.S. Pat. No. 4,442,057.

EXAMPLES 17–22 and

Comparative Example N–P

Pellets of the LCP and a commercial grade nylon-66 were compounded in a Baker-Perkins twin-screw extruder. The diameter of the screw flight was 4.921 cm (1.9375 in) and the screws operated at 100 rpm. The feed zone of the extruded was at 230° C., and the barrel temperatures were 230° C., 270° C. and 290° C. At the end of the extruder a spinning block was attached which housed a melt filter-pack and a spinneret plate with 34 holes. The melt spinning temperatures are reported in Table 3. The diameter of each hole was 0.254 mm (0.010 in) and the melt throughput was adjusted proportionally to the windup speed, as shown in Table 3, so that the produced yarn decitex was 139 or 4.08 decitex per filament at all speeds. The freshly spun filaments were quenched in an apparatus shown in FIG. 1. The quench apparatus included a housing 50 which forms a chamber 52, i.e., an enclosed zone supplied with pressurized gas Q at a rate of 0.85 m³/min (30 standard cubic feet per min) through inlet conduit 54 which was formed in the side wall 51 of the housing. A cylindrical screen 55 was positioned in chamber 52 to uniformly distribute gas flowing into the chamber. The diameter of the cylindrical screen 55 was 7.62 cm (3.0 in) and its length 38.1 cm (15 in). A spinning pack 16 was positioned centrally and directly above the housing which abuts the surface 16a of the pack. A spinneret (not shown) was attached to the bottom surface of the spinneret pack for extruding filaments 20 into a path from molten polymer supplied to the pack. In operation a molten polymer was metered into the spinning pack 16 and extruded as filaments 20. The filaments were pulled from the spinneret into a path

TABLE 3

| Ex. | WUS m/min | % LCP | Draw Tension, g | % PI |
|---|---|---|---|---|
| N | 2928 | 0 | 70.6 | — |
| O | 3385 | 0 | 86.1 | — |
| P | 4118 | 0 | 110.5 | — |
| 17 | 4118 | 0.5 | 74.3 | — |
| 18[a] | 4823 | 0.5 | 86.0 | 42.5 |
| 19 | 4575 | 0.5 | 92.9 | — |
| 20 | 5032 | 0.5 | 106.5 | — |
| 21[a] | 5627 | 0.5 | 110.0 | 37.7 |
| 22 | 5490 | 0.5 | 118.7 | — |

[a]Results interpolated.

From Table 3 it is evident that the LCP blend yields fibers that have the same draw tension and, expectedly, other properties, such as % elongation-to-break, at much higher speeds. For example, the control gives a draw tension of 86.1 grams at 3385 m/min and 110.5 grams at 4118 m/min, whereas the blend gives the same draw tensions at 4823 m/min and 5627 m/min respectively. Since the decitex per filament is the same in all cases, this increase in spinning speed translates to (4823−3385)×100/3385=42.5% and (5627−4118)×100/4118=37.7% melt flow rate or productivity increase respectively. This is a very significant increase produced by adding only 0.5% of the additive. In contrast, in U.S. Pat. No. 4,442,057 in Examples 5, 6 and 7 in Table 4 using nylon-6,6 as the thermoplastic, lower productivity increases by adding 12 times more LCP, i.e., 6% of X7G, CLOTH, or CO LCPs. Although the property used to calculate the productivity increase in Table 4 is % elongation-to-break and not draw tension and although these two properties may result in somewhat different productivity increases, this example shows the exceptionally high efficacy of the presently used LCPs in nylon-6,6.

Although particular embodiments of the present invention have been described in the foregoing description, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the invention.

What is claimed is:

1. A process for the melt spinning of one or more thermoplastics at windup speeds of about 1000 m/minute or more, wherein the improvement comprises, spinning said thermoplastic or thermoplastics as a blend which contains about 0.1 to about 10 percent by weight of a liquid crystalline polymer, said percentage based on a total amount of said thermoplastic or thermoplastics present plus said liquid crystalline present, and provided that said liquid crystalline polymer consists essentially of repeat of the formula:
(I) at least one repeat unit selected from the group consisting of

(IA)

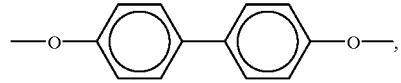
and
(IB)

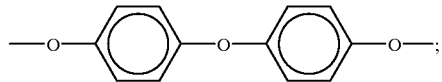
(IC)

(II)

(III) at least one repeat unit selected from the group consisting of

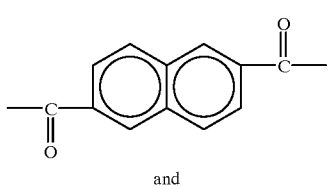
and
(IIIA)

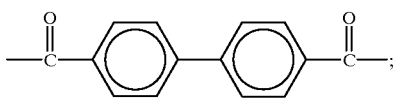
(IIIB)

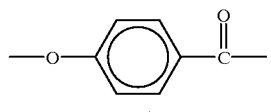
and
(IV)

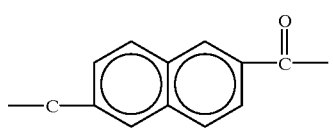
and
(V)

wherein:
a molar ratio of (II) to (III) ranges from about 25:75 to about 90:10;
a molar ratio of (I) to [(II)+(III)] is substantially 1:1;
a molar ratio of (IV) to (V) ranges from about 97:3 to about 50:50;
a number of moles of (IV) plus (V) ranges from about 100 to about 600 per 100 moles of (I); and
wherein (I), (II), (III), (IV), (V) and (VI) are in units of moles.

2. The process as recited in claim 1 wherein said thermoplastic is a polyester or a polyamide.

3. The process as recited in claim 1 wherein said thermoplastic is poly(ethylene terephthalate).

4. The process as recited in claim 1 wherein said thermoplastic is one or both of nylon-6,6 and nylon-6.

5. The process as recited in claim 1 wherein in said liquid crystalline polymer, repeat unit (I) consists essentially of (IA) and (IB) and the molar ratio of (IA) to (IB) is about 75:25 to about 25:75, the molar ratio of (II):(III) is about 30:70 to about 85:15, the molar ratio of (IV):(V) is about 50:50 to about 90:10, the number of moles of (IV) plus (V), per 100 moles of (I), is about 200 to about 500.

6. The process as recited in claim 1 wherein said thermoplastic is poly(1,3-propylene terephthalate).

7. The process as recited in claim 1, 2, 3, 4, 5 or 6 wherein about 0.5 to about 5 percent of said liquid crystalline polymer is present.